United States Patent
Yoder et al.

(10) Patent No.: US 11,155,424 B2
(45) Date of Patent: Oct. 26, 2021

(54) PNEUMATICALLY INFLATED PILLOW FOR GRAIN BIN UNLOAD

(71) Applicant: CNH Industrial America LLC, New Holland, PA (US)

(72) Inventors: Denver R. Yoder, Manheim, PA (US); Matthew Gyenes, Ephrata, PA (US); Mark D. Dilts, New Holand, PA (US)

(73) Assignee: CNH Industrial America LLC, New Holland, PA (US)

( * ) Notice: Subject to any disclaimer, the term of this patent is extended or adjusted under 35 U.S.C. 154(b) by 76 days.

(21) Appl. No.: 16/676,512

(22) Filed: Nov. 7, 2019

(65) Prior Publication Data

US 2021/0139255 A1    May 13, 2021

(51) Int. Cl.
*B60P 1/40* (2006.01)
*B65G 53/50* (2006.01)
*A01D 90/10* (2006.01)

(52) U.S. Cl.
CPC ............. *B65G 53/50* (2013.01); *A01D 90/10* (2013.01)

(58) Field of Classification Search
CPC ........ B65G 33/20; B65G 33/14; B65G 47/20; B65G 53/50; B65G 53/36; B65G 53/48; B65G 65/40; B65G 65/46; B65G 69/08; B65D 88/005; B65D 88/60; B65D 88/62; B65D 90/021; B65D 2588/162; A01D 41/1217; A01D 90/10; A01D 90/12; A01D 90/105; B60P 1/40; B60P 1/42
USPC ....... 406/53, 73, 76, 134; 222/203; 414/526, 414/310, 319, 320, 321
See application file for complete search history.

(56) References Cited

U.S. PATENT DOCUMENTS

| | | | | |
|---|---|---|---|---|
| 1,570,795 A | * | 1/1926 | Tainton ................. | B65D 88/66 222/1 |
| 2,732,099 A | * | 1/1956 | Davis .................... | B65D 88/66 222/1 |
| 3,604,578 A | * | 9/1971 | Smith .................... | B61D 5/004 414/467 |
| 3,669,317 A | * | 6/1972 | Ivchenko ............... | B65D 88/72 222/195 |
| 3,941,258 A | | 3/1976 | Ide | |
| 4,251,013 A | * | 2/1981 | Krause .................. | B65D 88/72 222/198 |
| 4,359,172 A | * | 11/1982 | Kane ..................... | B65D 88/70 222/1 |
| RE32,232 E | * | 8/1986 | Bonerb .................. | B65D 88/62 222/105 |

(Continued)

FOREIGN PATENT DOCUMENTS

CA        2056780 A1    6/1993
WO    2018148343 A1    8/2018

*Primary Examiner* — Joseph A Dillon, Jr.
(74) *Attorney, Agent, or Firm* — Peter Zacharias; Patrick Sheldrake

(57) ABSTRACT

An exemplary embodiment of the present invention is directed to an apparatus for emptying material from a container on a vehicle. The apparatus has a container with a bottom surface and a sidewall. A membrane being mounted within the container proximate the sidewall and the bottom surface. The apparatus further includes an engine and ducts having a first end and a second end. The first end connected to the engine so as to receive gas from the engine and connected at the second end to the membrane so as to direct the gas into the membrane.

20 Claims, 6 Drawing Sheets

(56) References Cited

U.S. PATENT DOCUMENTS

| | | | | |
|---|---|---|---|---|
| 4,643,475 A * | 2/1987 | Neumann | B60P 3/426 | 105/243 |
| 4,722,655 A * | 2/1988 | Bonerb | B60P 1/56 | 105/243 |
| 4,945,957 A * | 8/1990 | Kardux | B65B 1/12 | 141/128 |
| 5,215,228 A * | 6/1993 | Andrews | B65D 88/66 | 222/203 |
| 5,353,966 A * | 10/1994 | Stutz | B65D 88/68 | 222/145.6 |
| 5,490,561 A * | 2/1996 | Cardoso-Neto | E21B 49/084 | 166/105 |
| 5,494,394 A * | 2/1996 | Podd | B65D 88/56 | 220/1.6 |
| 5,657,896 A * | 8/1997 | Matias | B65D 90/048 | 220/1.6 |
| 5,697,523 A * | 12/1997 | Brandauer | B65D 90/56 | 141/248 |
| 6,283,680 B1 * | 9/2001 | Vidal | B65G 53/32 | 406/128 |
| 6,491,480 B2 * | 12/2002 | Waddell | B65G 19/14 | 406/81 |
| 6,769,571 B2 | 8/2004 | Mino | | |
| 6,796,748 B1 * | 9/2004 | Sperber | E04F 21/085 | 222/636 |
| 6,974,296 B2 * | 12/2005 | Simrin | B60P 1/00 | 414/525.1 |
| 7,125,204 B2 * | 10/2006 | Wysong | B60P 1/60 | 406/38 |
| 7,153,077 B2 * | 12/2006 | Warner | B30B 9/3042 | 414/398 |
| 7,303,362 B2 * | 12/2007 | Dunlop | B60P 1/00 | 222/608 |
| 7,827,818 B2 * | 11/2010 | McCormick | B65G 47/22 | 62/380 |
| 8,065,859 B1 * | 11/2011 | Wingert | A01F 25/183 | 53/439 |
| 8,454,095 B1 * | 6/2013 | Dilts | B60P 1/003 | 298/1 B |
| 8,590,740 B2 * | 11/2013 | Mauger | B67D 7/0216 | 222/1 |
| 8,616,358 B2 * | 12/2013 | Dunn | B65D 88/66 | 193/25 B |
| 8,622,660 B1 * | 1/2014 | Gore | A01K 5/0208 | 406/41 |
| 8,702,849 B2 * | 4/2014 | Matson | B01D 39/083 | 95/273 |
| 8,915,691 B2 * | 12/2014 | Mintz | B65D 88/30 | 414/305 |
| 8,919,537 B2 * | 12/2014 | Andersson | B60P 1/38 | 198/611 |
| 9,051,801 B1 * | 6/2015 | Mintz | B65D 88/54 | |
| 9,459,183 B1 * | 10/2016 | Schnakenberg | G01N 1/20 | |
| 9,725,025 B2 * | 8/2017 | Meier | B60P 1/42 | |
| 10,081,499 B2 * | 9/2018 | Goodier | B65G 53/24 | |
| 10,138,609 B2 * | 11/2018 | Boschung | E01H 10/007 | |
| 10,220,757 B2 * | 3/2019 | Jung | B60P 1/52 | |
| 10,562,702 B2 * | 2/2020 | Harris | B65D 88/32 | |
| 10,654,667 B2 * | 5/2020 | Orban | B65G 65/425 | |
| 10,926,940 B2 * | 2/2021 | Allegretti | B65D 19/08 | |
| 11,014,767 B2 * | 5/2021 | Douglas | B65G 47/82 | |
| 2006/0078412 A1 * | 4/2006 | Hagemann | B65D 88/60 | 414/467 |
| 2007/0048113 A1 * | 3/2007 | McMahon | B65D 90/046 | 414/467 |
| 2008/0001130 A1 * | 1/2008 | Dibdin | B66F 7/085 | 254/93 HP |
| 2013/0004272 A1 * | 1/2013 | Mintz | B65D 88/30 | 414/304 |
| 2014/0110218 A1 * | 4/2014 | Dunn | B65D 88/66 | 193/2 R |
| 2016/0010295 A1 * | 1/2016 | Boschung | B60P 1/40 | 239/650 |

\* cited by examiner

PNEUMATICALLY INFLATED PILLOW FOR GRAIN BIN UNLOAD

FIELD OF THE INVENTION

The present invention pertains to an apparatus for unloading grain from a grain bin and, more specifically, to a pneumatically inflated pillow mounted within the grain bin for unloading the grain.

BACKGROUND OF THE INVENTION

Mobile combine harvesters, combines or harvesters are typically fitted with a grain bin on top of the combine harvester or combine for temporarily storing grains or other crops while harvesting. The grains or other crops are typically emptied from the grain bin with one or more augers configured to drag the grain or crops out of the bin. In some configurations, the grain bin is formed with a generally flat bottom surface in order to maximize the capacity of the grain bin, but in these configurations, the auger(s) cannot access all the grains or crops, and some of the valuable grain or crop material is left in the bin at the end of the emptying process because gravity does not feed the grains or crops into the inlet of the auger, which is located at a single position near the base of the bin. In other configurations, the grain bin is formed with a sloped bottom surface, allowing gravity to direct the grains or crops to the auger for emptying. These sloped bottom grain bin configurations sacrifice volume within the bin, which is eliminated by the pitch of the bottom of the bin. The greater the pitch at the bottom of the bin, the greater the amount of volume lost for storage purposes. While these sloped or pitched configurations more efficiently unload the grains or crops, there is unused space below the sloped or pitched bottom surface, and the shape of such a grain bin causes the grain or crops to be stored higher in the grain bin, thus raising the center of gravity of the combine and reducing the stability of the combine or harvester. The higher center of gravity is particularly undesirable when the combine is traversing sloped or uneven ground during use, particularly when the grain bin is full or nearly full of harvested grain and crops.

There, therefore, exists a need for a grain bin having a bottom surface which can be retracted to be generally flat, thereby maximizing the capacity of the grain bin and lowering its center of gravity, but also extending into a sloped configuration or an unloading configuration, so as to urge stored grains toward the auger for emptying the bin. It is desirable that this system utilizes existing components of the combine for structure and operation to reduce complication and expense.

SUMMARY OF THE INVENTION

An exemplary embodiment of the present invention is directed to an apparatus for emptying material from a container on a vehicle. The apparatus has a container with a bottom surface and a sidewall. A membrane is mounted within the container proximate the sidewall and the bottom surface. The apparatus for emptying material from the container is associated with an engine of a vehicle, and ducts having a first end and a second end, wherein the ducts connect the engine to the membrane so as to selectively direct the gas into the membrane to transition the membrane from an inflated to a deflated configuration.

The preferred invention is also directed to an apparatus for emptying material from a vehicle such as a combine harvester. The apparatus includes a container, a membrane mounted within the container, an engine and ducts having first and second ends. The container has a bottom surface and a first sidewall. The membrane is positioned proximate the first sidewall and the bottom surface of the container. The engine powers the operation of the vehicle. The ducts are connected at the first end to the engine so as to receive pressurized gas from the engine and at the second end to the membrane so as to direct the gas into the membrane. The operator selectively directs the system to inflate the membrane to create a pitched or sloped surface for urging grain into an auger and deflate the membrane such that the membrane is positioned substantially flat or in facing engagement with the bottom surface. The system also includes a detector or sensor, such as a weight sensor, volume sensor or grain height sensor, to determine when the container is full or nearly full of grain. The detector or sensor provides a warning to the operator of the combine that the container or bin should be emptied. The sensor also provides a warning to the operator that the container or bin may have residual grain therein after an unloading or emptying process and provides a warning to inflate the membrane to urge the grain toward the inlet of the auger. Alternatively, the sensor may automatically cause the membrane to inflate following the unloading or emptying process if excess grain is detected within the container or bin.

BRIEF DESCRIPTION OF THE DRAWINGS

For the purpose of illustration, there are shown in the drawings certain exemplary embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

Figure 1:
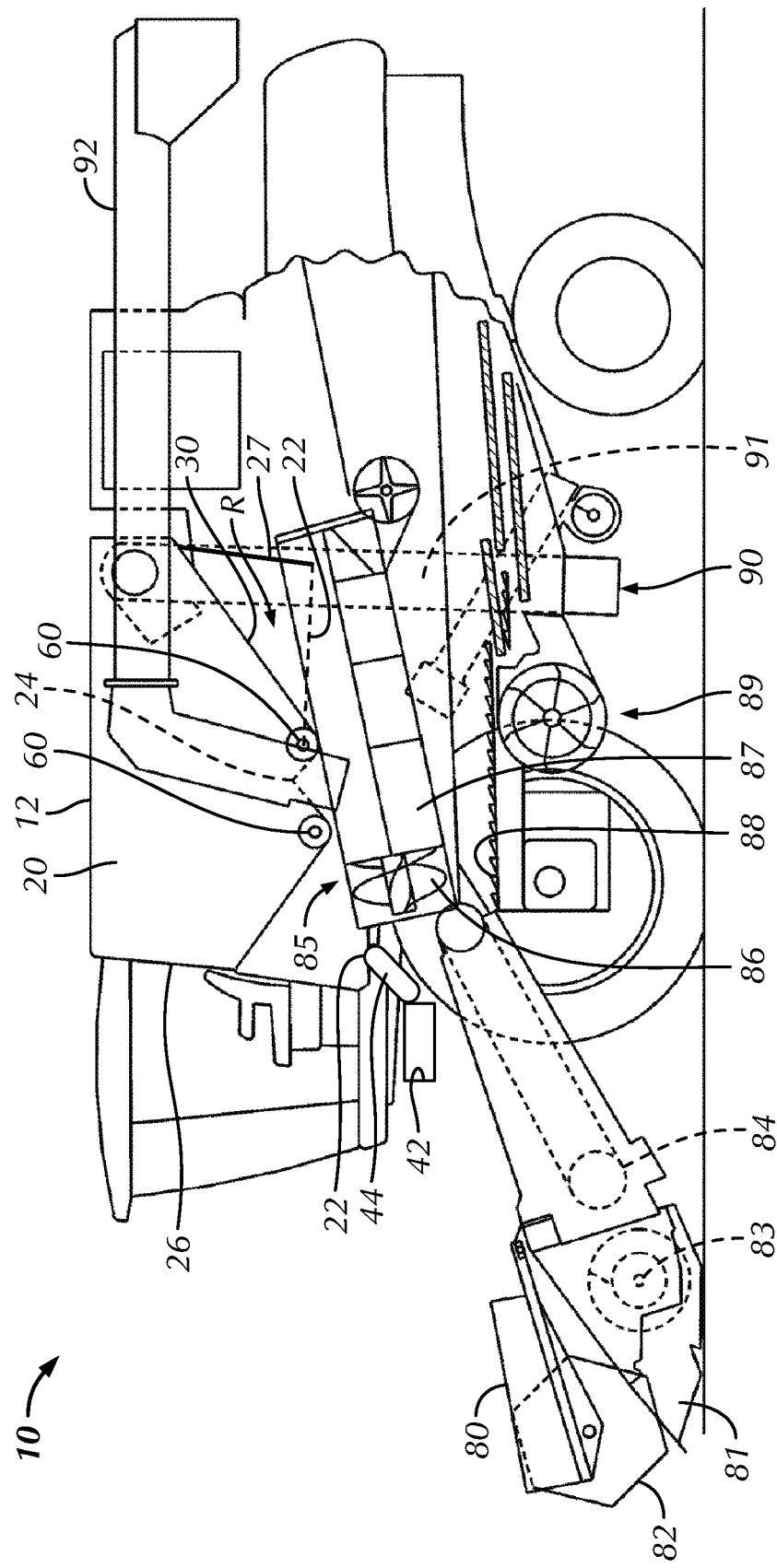
FIG. 1 illustrates a side elevational view of an exemplary embodiment of a mobile combine, harvester, or transporter having a grain bin or container mounted thereto, wherein the grain bin includes an inflatable membrane of an apparatus for emptying the grain bin, in accordance with an exemplary embodiment of the present invention.

Certain terminology is used in the following description for convenience only and is not limiting. Unless specifically set forth herein, the terms "a", "an" and "the" are not limited to one element but instead should be read as meaning "at least one". The words "right," "left," "lower," and "upper" designate directions in the drawings to which reference is made. The words "inwardly" or "distally" and "outwardly"

or "proximally" refer to directions toward and away from, respectively, the geometric center or orientation of the apparatus for emptying material from a bin associated with a vehicle and related parts thereof. The terminology includes the above-listed words, derivatives thereof and words of similar import.

It should also be understood that the terms "about," "approximately," "generally," "substantially" and like terms, used herein when referring to a dimension or characteristic of a component of the invention, indicate that the described dimension/characteristic is not a strict boundary or parameter and does not exclude minor variations therefrom that are functionally the same or similar, as would be understood by one having ordinary skill in the art. At a minimum, such references that include a numerical parameter would include variations that, using mathematical and industrial principles accepted in the art (e.g., rounding, measurement or other systematic errors, manufacturing tolerances, etc.), would not vary the least significant digit.

Referring to FIG. 1, a first exemplary embodiment of the present invention is directed to a mobile combine or harvester 10 having a grain bin 20. The grain bin 20 preferably includes a container 12 having a bottom surface 22 and an opening 24. The grain bin 20 also preferably includes a membrane 30 mounted within the container 12 on or proximate the bottom surface 22. The membrane 30 is preferably constructed of a flexible and substantially inelastic material, such as nylon, canvas, polyvinylchloride, or a vinyl-coated fabric mesh, but is not so limited. The membrane 30 may also be constructed as an airbag or bladder, but may further be of any construction suitable for holding a volume of air or other gas into a shape that urges grain or other material within the grain bin 20 toward the opening 24. The membrane 30 may also be constructed of multiple layers or have a composite construction. The membrane 30 is preferably positioned generally flat on or in generally facing engagement with the bottom surface 22 in an uninflated configuration and is spaced or arranged at a slope or pitch relative to the bottom surface 22 in an inflated configuration, as is described in greater detail below.

In the first exemplary embodiment, the bottom surface 22 of the container 12 is preferably, substantially flat and generally parallel to the ground. The bottom surface 22 preferably extends generally perpendicularly relative to generally vertical sidewalls, such as a first wall or first sidewall 26 or a second wall or second sidewall 27, of the container 12, but may be of any shape or configuration suitable for holding any material. The container 12 and bottom surface 22 may, for example, have an irregular shape that is form fitted around obstructions or components of the mobile combine 10 that may protrude into the container 12 or the container 12 may substantially wrap around the components to maximize the carrying space in the container 12. The membrane 30 is preferably constructed such that when inflated or positioned in an inflated configuration, the membrane 30 will fill all or nearly all the space in a region R, which has a generally triangular cross-sectional shape, of the container 12 by inflating to a shape that is substantially adjacent to both the bottom surface 22 and the first wall or sidewall 26 or the second wall or sidewall 27 of the container 12. In the preferred embodiment, the first wall or sidewall 26 is a front wall of the container 12 and the second wall or sidewall 27 is a rear wall of the container 12 and in a most preferred embodiment, the membrane 30 is associated with the rear or second wall 27 of the container 12. When inflated, the membrane 30 is preferably shaped to slope downwardly toward the opening 24 at a dispensing angle X of approximately thirty-seven degrees)(37°, but is not so limited. The dispensing angle X is preferably within a range of approximately twenty-five to fifty degrees)(25-50°, but is not specifically so limited and may be designed and configured to have nearly any dispensing angle X or configuration, such as an arcuate configuration, that facilitates urging the grain or other material in the container 12 and on the top surface of the membrane 30 in the inflated configuration toward the opening 24 so that the container 12 is emptied or substantially emptied of grain or other material when the membrane 30 is in the inflated configuration and the system is operated to dispense the grain or other material. The first exemplary embodiment may also include at least one strap 34 placed on or adjacent to the membrane 30 to control its shape, when inflated. The strap 34 may be positioned internally within the membrane 30 or may be incorporated into the material of the membrane 30 to drive a specific shape of the membrane 30 in the inflated configuration. As a non-limiting example, the strap 34 may create a ditch or flow channel in the top surface of the membrane 30 to urge the grain to a specific area near or in the opening 24.

In the first exemplary embodiment, the preferred material emptying apparatus includes an air compressor 42 disposed nearly anywhere on the mobile combine, vehicle or harvester 10 for filling the membrane 30 with air or nearly any gas or inflation liquid. The air compressor 42 may be actuated by a controller or by the operator to selectively move the membrane 30 from the uninflated configuration where the membrane 30 is adjacent to the bottom surface 22 and the inflated configuration (FIGS. 1 and 3) where the membrane is generally spaced from the bottom surface 22 and oriented at the dispensing angle X to urge the grain on the top surface of the membrane 30 toward the opening 24. The air compressor 42 is preferably affixed to ducts 44 that are in turn affixed to and are in fluid communication with the membrane 30. The air compressor 42 preferably compresses air for the introduction of the pressurized air into the ducts 44 and the membrane 30, but may also be comprised of a tank of pressurized air or other compressible gas or fluid for selective inflation of the membrane 30 In the configuration of the system with the air compressor 42, air that is output from the air compressor 42 may be funneled through the ducts 44 to inflate the membrane 30 or may be diverted away from the ducts 44 so that the membrane 30 is not inflated or is in the uninflated configuration. In the uninflated configuration, the grain may fill the entire volume of the bin 20 to increase efficiency of harvesting. The air compressor 42 may be mechanically operated by the operator or may be electronically operated by the operator by actuating a controller in the cab of the combine 10.

Figure 2A:
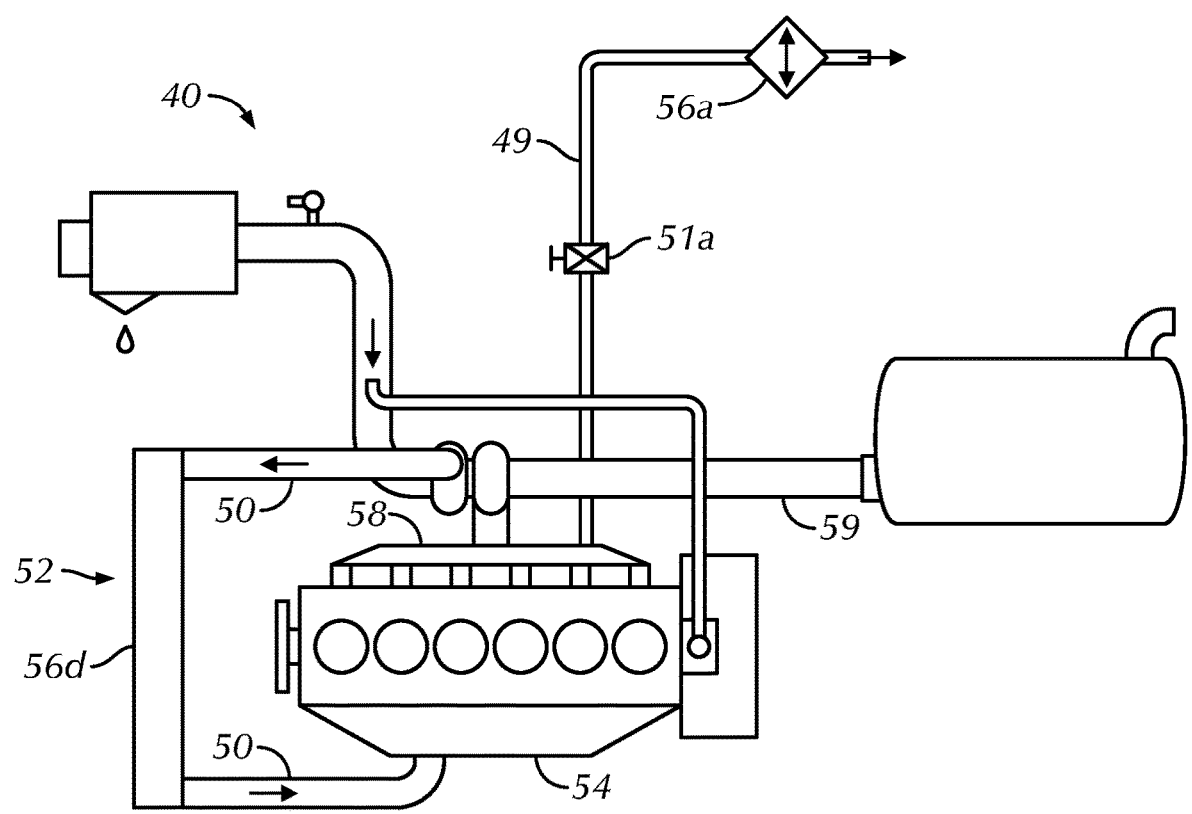
FIG. 2A illustrates a first exemplary embodiment of an engine and ducts for inflating the membrane of the apparatus of FIG. 1.

Referring to FIGS. 2A-2D, four exemplary embodiments for inflating the membrane 30 with pressurized air from an engine 54 of the combine 10 utilizing a combine pressurized air circulation system 40 are shown. Referring specifically to FIG. 2A, ducts 49 of the first preferred embodiment are provided and configured to receive blowoff, compressed air or exhaust gas from the engine 54 of the combine or harvester 10. The ducts 49 of this first exemplary embodiment are attached directly to the engine manifold 58. The first preferred combine pressurized air circulation system 40 preferably also includes a cooler or chiller 56a for cooling the compressed air or blowoff gas, such as an intercooler or a heat exchanger, connected to the ducts 49. Additional ducts 50 are also utilized to direct the flow of air and gasses through the pressurized air circulation system 40. The cooler or chiller 56a cools the compressed air prior to the gas being funneled into the membrane 30 through the ducts 49 so that the hot temperatures found in the engine 54 do not cause damage to the membrane 30. The membrane 30 may alternatively be designed and configured with a material that is resistant to high temperatures of the exhaust air and generally insulative to limit exposure of the grain to high temperatures and components of the exhaust air. A valve 51a is preferably positioned in the ducts 49 between the engine manifold 58 and the chiller 56a to direct the pressurized gas from the manifold 58 from a first end of the ducts 49 to a second end of the ducts 49 that is connected to the membrane 30. The valve 51a may be mechanically or electronically actuated by the operator from the cab of the combine 10. Alternatively, the valve 51a may be automatically actuated to direct pressurized gas to the membrane 30 by a central controller after an unloading process of the bin 20, when a sensor indicates the bin 20 or container 12 has remaining grain therein after an unloading process or based on other predetermined factors.

Figure 2B:
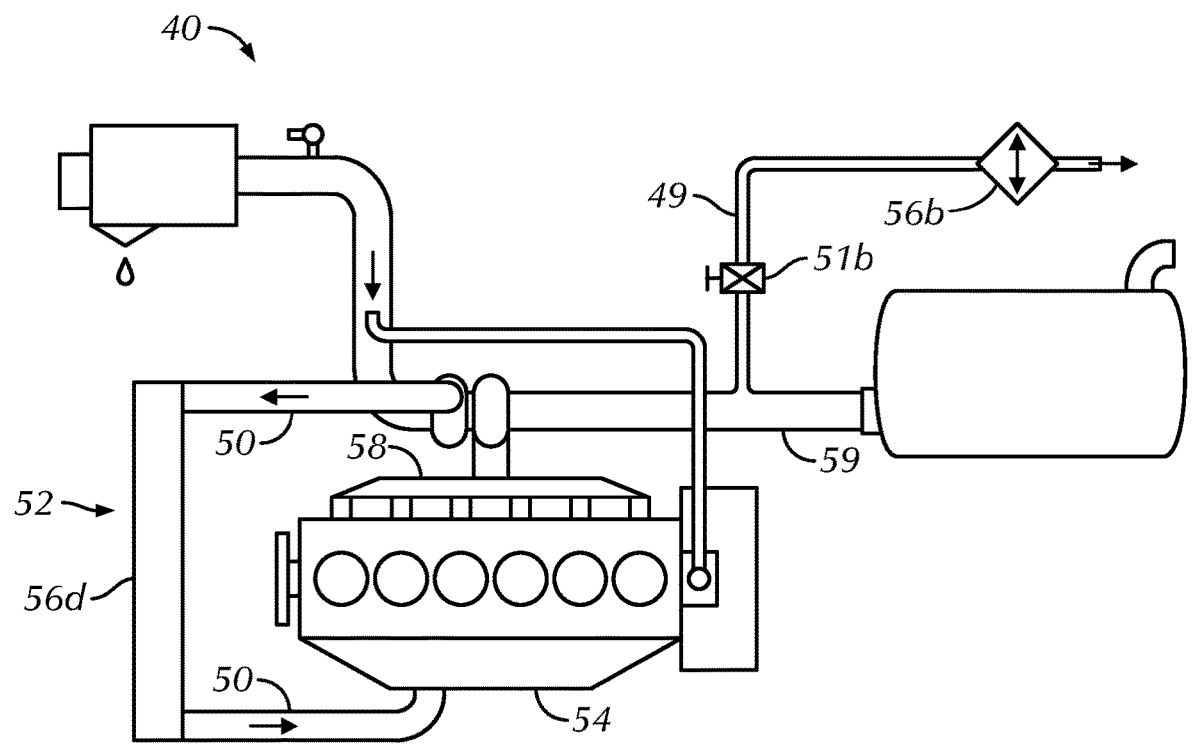
FIG. 2B illustrates a second exemplary embodiment of an engine and ducts for inflating the membrane of the apparatus of FIG. 1.

Referring now to FIG. 2B, the ducts 49 of the second preferred combine pressurized air circulation system 40 are attached to the exhaust gas opening 59 of the engine 54. In this second exemplary embodiment, the combine pressurized air circulation system 40 preferably also includes the cooler or chiller 56b for cooling the compressed air connected to the ducts 49 prior to the gas being funneled into the membrane 30 through the ducts 49. The pressurized gas is preferably directed into the membrane 30 by actuating the valve 51b between the exhaust gas opening 59 and the duct 49 running from the exhaust gas opening 59 to the membrane 30. The valve 51b may be manually or electronically actuated, similarly to the valve 51a of the exemplary embodiment of FIG. 2A.

Figure 2C:
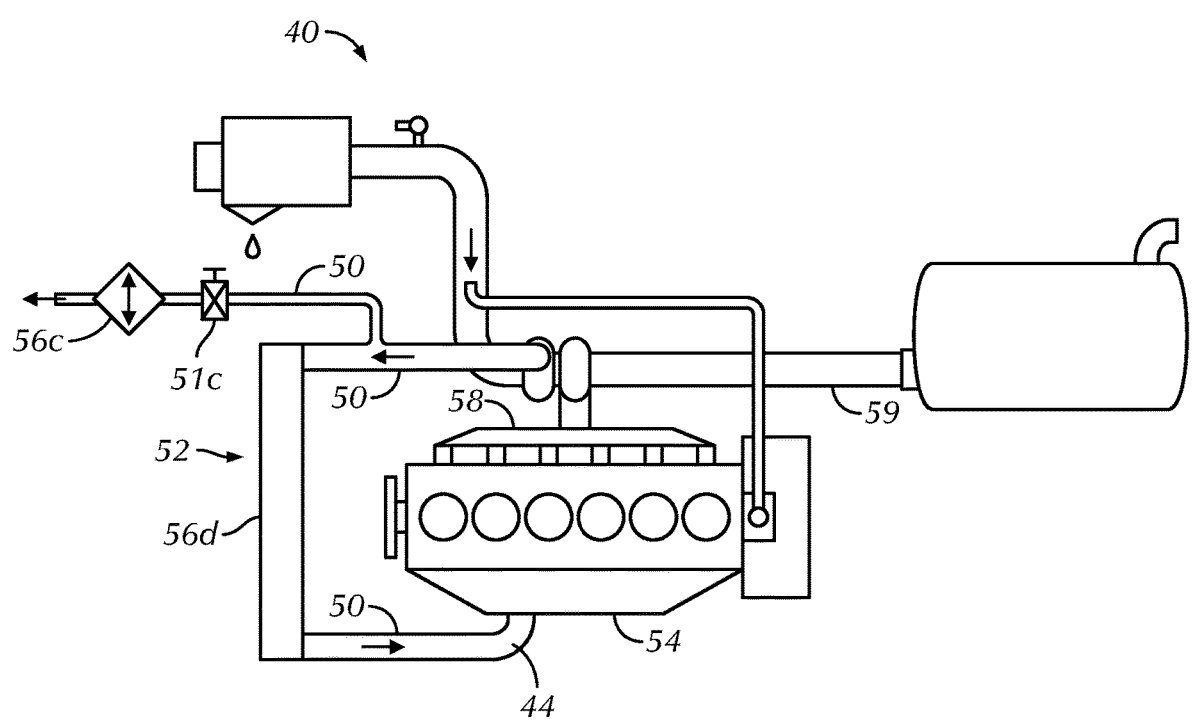
FIG. 2C illustrates a third exemplary embodiment of an engine and ducts for inflating the membrane of the apparatus of FIG. 1.

Referring now to FIG. 2C, the combine pressurized air circulation system 40 of the third preferred embodiment may also be implemented where the engine 54 is provided with a turbocharger 52, which is connected to ducts 50 that funnel the compressed iar or blowoff gas into the cooler 56c. The cooler 56 preferably cools the compressed air and is preferably connected to additional ducts 44 that return the cooled gas into the engine 54. In the exemplary embodiments where the engine 54 is fitted with a turbocharger 52, the cooler 56c is preferably an intercooler, but is not so limited. The combine pressurized air circulation system 40 may be implemented by attaching other ducts to capture a portion of the compressed air prior to the gas entering the cooler 56c, which preferably further includes additional cooling capacity to cool the compressed air prior to the gas being funneled by the ducts 50 into the membrane 30 for inflating the membrane 30. The pressurized gas from the engine 54 is preferably diverted to the membrane 30 by actuation, either mechanically, electronically or automatically, as was described above, of a valve 51c in the ducts 50.

Figure 2D:
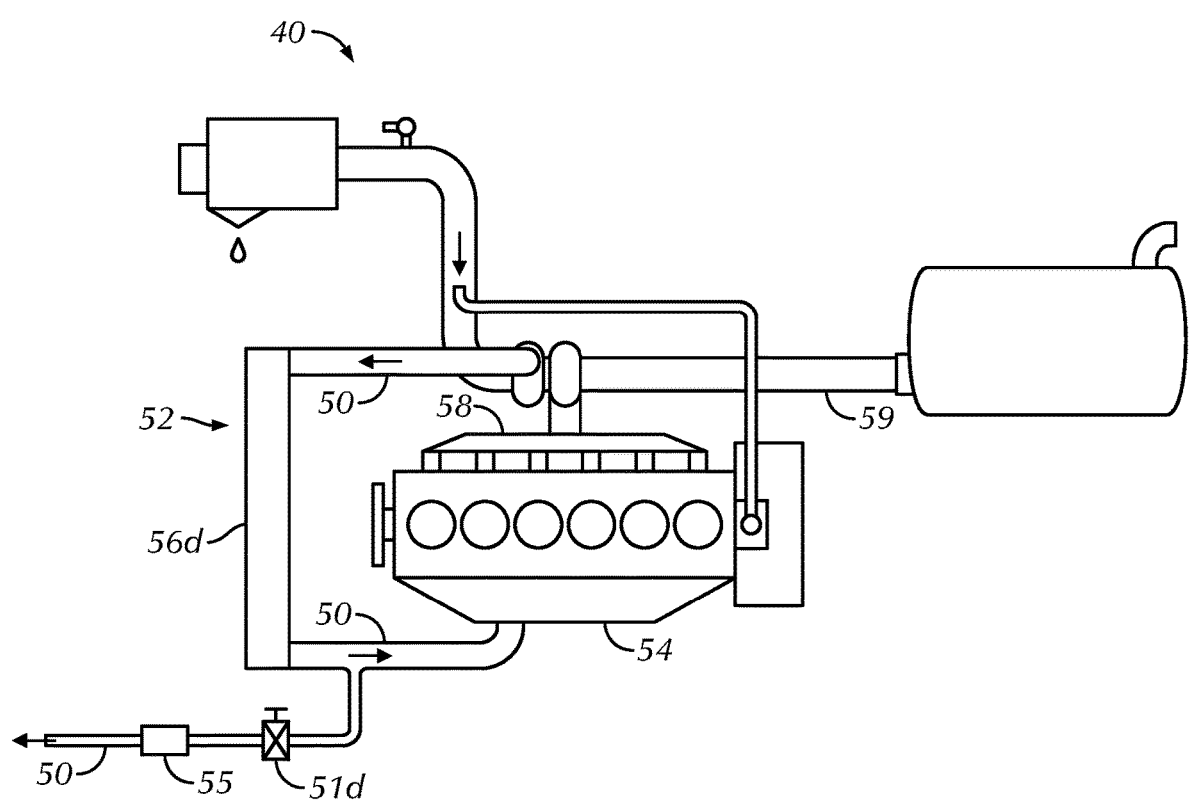
FIG. 2D illustrates a fourth exemplary embodiment of an engine and ducts for inflating the membrane of the apparatus of FIG. 1.

Referring now to FIG. 2D, the combine pressurized air circulation system 40 of the fourth preferred embodiment is implemented by attaching additional ducts 50 to capture a portion of the compressed air after it is cooled by the intercooler 56d of the turbocharger 52, in which case the intercooler 56d is used to cool the compressed air, some of which is then diverted back into the engine 54 and some of which is diverted into the membrane 30 to urge the membrane 30 into the inflated configuration for displacing the grain toward the opening 24. The diversion of the gas to the membrane 30 is preferably actuated by operation of the valve 51d in the duct 50 between the intercooler 56d and the membrane 30, preferably in a manner similar to the operation of the valves 51a, 51b, 51c described above.

Referring again to FIG. 1, in use, grain or other crops may be harvested by the mobile combine or harvester 10 via a header 80 preferably mounted to the front of the mobile combine or harvester 10. The header 80 preferably includes a cutter bar 81 for severing grain or other crops from a field during forward motion of the mobile combine or harvester 10. A rotatable reel 82 preferably feeds the grain into the header 80, and a double auger 83 preferably feeds the severed grain laterally inwardly from each side toward a feeder housing 84. The feeder housing 84 then preferably conveys the cut grain to a threshing and separating system 85, which preferably includes a rotor 86 at least partially enclosed by and rotatable within a corresponding perforated concave 87. The cut grain is then preferably threshed and separated by the rotation of the rotor 86 within the concave 87, and larger elements, such as stalks, leaves, and the like, are preferably discharged from the rear of the mobile combine or harvester 10. Smaller elements of the grain, including particles lighter than grain such as chaff, dust, and straw, are then preferably discharged through perforations of concave 87. Grain which has been separated by the threshing and separating assembly 85 falls onto a grain pan 88 and is preferably conveyed toward a cleaning system 89 to remove chaff and other impurities from the grain.

Cleaned grain then preferably falls to an auger system 90, which is represented in FIG. 1 as a rectangular box for ease of illustrating its relative position on the mobile combine or harvester 10. The auger system 90 then conveys the cleaned grain to a generally vertically arranged grain elevator 91, which preferably transports the cleaned grain into the grain bin 20. The processed grain is dropped into the grain bin 20 and the container 12 for storage during operation or at least until the grain can be unloaded.

Figure 3:
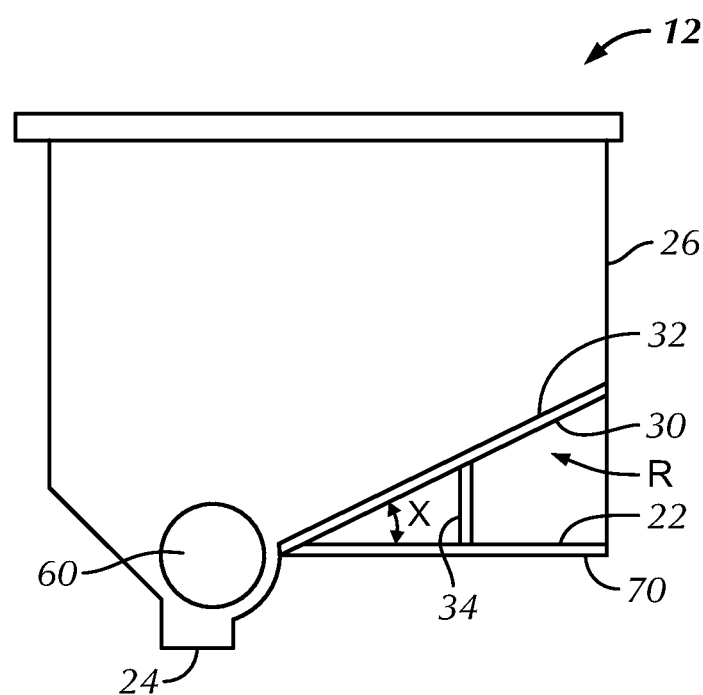
FIG. 3 illustrates the grain bin of the apparatus of FIG. 1, wherein the membrane is positioned in an inflated configuration.

Referring now to FIGS. 1 and 3, the present invention also preferably includes one or more augers 60 positioned in or near the opening 24. The cross augers 60 at the bottom of the grain bin 20 or container 12 convey the clean grain within the grain bin 20 or container 12 to an unloading auger 92 for discharge from the combine 10. In use, the auger 60 may be used to mechanically remove grain or other material from the bin 20 through the opening 24 to the unloading auger 92 for discharge from the mobile combine or harvester 10. The container 12 may also include a rigid surface 32 mounted within, above, or below the membrane 30. The rigid surface 32 may be constructed of an insulating, structural material that insulates the grain in the bin 20 from potentially warm pressurized gas within the membrane 30. The rigid surface 32 is preferably oriented at the dispensing angle X when the membrane 30 is in the inflated configuration.

In the preferred embodiment, the system includes a scale or weight sensor 70 placed in a suitable location to measure the weight of any material within the container 12 and the bin 20. The scale 70 is preferably placed at or near the bottom surface 22 and may provide an indication to the user that the bin 20 includes grain therein, the level of grain in the bin 20 or may collect weight data, indicating that the bin 20 is empty. The scale 70 may take on any form capable of measuring the fill level of the tank, such as a diaphragm sensor, but is not so limited. Where the total volume of the inflated membrane 30 is known, the scale 70 may also be used to calculate the pressure of the gas within the membrane 30. In this configuration, the membrane 30 may be kept at a predetermined gas pressure based on the measurements of the scale 70. Harvested wheat, for example, weighs approximately forty eight (48) pounds per cubic foot, or one-third (⅓) of one pound per square inch (psi). Therefore, approximately one-third psi per vertical foot of grain in the bin 20 is needed to inflate the membrane 30. In addition, a pressure sensor 55 may be placed in any of the ducts 50 or within the membrane 30, as shown in an exemplary embodiment in FIG. 2D, to calculate the pressure of the gas in the membrane 30. Such a pressure sensor 55 may be of a piezoelectric or pneumatic type, but is not so limited. The membrane 30 may only be inflated when the weight of the grain detected by the scale 70 drops below a predetermined threshold (i.e., when the volume of grain is nearly empty) or at a predetermined time during the emptying sequence, such as near the end of the sequence. The membrane 30 may then automatically be deflated upon the completion of the emptying sequence. The membrane 30 may also be operated in the inflated configuration while the sensor 55 indicates the bin 20 is empty to direct any introduced grain toward the opening 24 and may be deflated when a certain threshold of grain is present in the bin 20 to maximize storage space for the grain during operation. The sensor 55 is not limited to being comprised of a pressure sensor 55 and may be comprised of nearly any sensor that is able to operate in the environment of the combine 10, withstand the normal operating conditions of the sensor 55 and provide data to a central controller or to the operator regarding the volume of grain in the bin 20. For example, the sensor may be comprised of a visual sensor that detects a predetermined level of grain in the bin 20, a strain gauge that measures load on the bin 20, the membrane 30 or other components of the system or additional sensors that facilitate determination of the volume of grain in the bin 20. The pressure sensor 55 may also be utilized with the controller to calculate or estimate the weight of the grain in the bin 20 based on the gas pressure in the membrane 30. The controller may utilize the acquired pressure data from the pressure sensor 55 to sequence inflation and/or deflation of the membrane 30 or to monitor the bin 20 during operation of the combine 10.

In operation, for example, the controller may hold the pressure, as measured by the pressure sensor 55, within the membrane 30 at a predetermined pressure that is sufficient to lift a small volume of grain in the bin 20, but insufficient to lift a large volume of grain. The bin 20, therefore, empties via typical means under gravity until only a small volume of grain is above the membrane 30. When the small volume of grain is on the membrane 30, the reduced reaction pressure from the grain results in expansion of the membrane 30 with the lower internal pressure, thereby causing the membrane 30 to expand and urge the smaller volume of grain toward the augers 60 and opening 24. In an alternatively process, the membrane 30 may be substantially fully deflated so lay in substantially facing engagement with the walls of the bin 20 or container 12 and the controller may actuate the membrane 30 to inflate at the end of an unloading cycle to unload a majority of the grain from the bin 20 or container 12.

The controller may collect data from the sensor 55 and additional sensors in the system and automatically inflate and deflate the membrane 30 based on the collected data. For example, the central controller may actuate the valves 51a, 51b, 51c, 51d to urge pressurized gas into the membrane 30 when no or a predetermined and relatively small amount of grain is detected in the bin 20 so that all of the minimal amount of grain is urged toward the opening 24. In addition, the controller may actuate a release valve (not shown) attached to the membrane 30 to release pressurized air from the membrane 30 to actuate the membrane 30 from the inflated to the uninflated configuration. The controller may also automatically actuate the membrane 30 to the inflated configuration near the end of an unloading process when limited grain is detected in the bin 20 to urge stored grains from the bin 20 by ensuring nearly all of the grain is unloaded during operation.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. An apparatus for emptying material from a vehicle, the apparatus comprising:
   a container having a bottom surface and a first sidewall;
   a membrane mounted within the container proximate the first sidewall and the bottom surface;
   an engine that powers the vehicle; and
   ducts having a first end and a second end, the ducts connected at the first end to the engine so as to receive gas from the engine and at the second end to the membrane to direct the gas into the membrane.

2. The apparatus of claim 1, further comprising:
   a cooler in fluid communication with the ducts for cooling the gas.

3. The apparatus of claim 2, wherein the cooler is comprised of one of an intercooler and a heat exchanger.

4. The apparatus of claim 2, wherein the cooler is connected to the ducts between the first and second ends.

5. The apparatus of claim 1, further comprising:
   a manifold attached to the engine, wherein the first end of the ducts is connected to the manifold to receive the gas from the manifold.

6. The apparatus of claim 1, wherein the engine further comprises an exhaust gas opening and the first end of the ducts is connected to the exhaust gas opening.

7. The apparatus of claim 1, further comprising:
   a turbocharger and an intercooler, the first end of the ducts is connected to the intercooler to receive the gas from the intercooler in a cooled state.

8. The apparatus of claim 1, wherein the bottom surface is substantially flat.

9. The apparatus of claim 1, wherein the membrane is constructed of a flexible material.

10. The apparatus of claim 1, further comprising:
    an auger attached to the container.

11. The apparatus of claim 10, wherein the auger is comprised of a plurality of augers attached to the container.

12. The apparatus of claim 1, wherein the membrane is constructed of a substantially inelastic material.

13. The apparatus of claim 1, wherein the membrane is constructed of multiple layers.

14. The apparatus of claim 1, wherein the membrane is constructed of one of a polyvinylchloride and a vinyl-coated fabric mesh.

15. The apparatus of claim 1, further comprising:
    a strap configured to shape the membrane when inflated.

16. The apparatus of claim 1, wherein the vehicle is a mobile combine or harvester.

17. The apparatus of claim 1, further comprising:
    a sensor for measuring the weight of any material within the container, the sensor mounted to the bottom surface.

18. The apparatus of claim 1, wherein the membrane is configured to inflate to a dispensing angle, the dispensing angle being approximately thirty-seven degrees with respect to the bottom surface.

19. The apparatus of claim 1, further comprising a rigid surface mounted proximate the membrane, the rigid surface configured to be movable from a substantially flat position proximate the bottom surface of the container to an angled position, the rigid surface movable from the substantially flat position to the angled position with the membrane, the rigid surface being in the substantially flat position when the membrane is in the uninflated configuration and in the angled position when the membrane is in the inflated configuration.

20. The apparatus of claim 1, further comprising:
a sensor for measuring pressure of the gas in the membrane; and
a controller in communication with the sensor, the controller configured to sequence inflation and deflation of the membrane and monitor the inflation and deflation of the membrane during operation.

* * * * *